Nov. 19, 1929.  J. A. MUIR  1,736,617
MECHANICALLY OPERATED BUTT WELDER
Filed Nov. 11, 1926
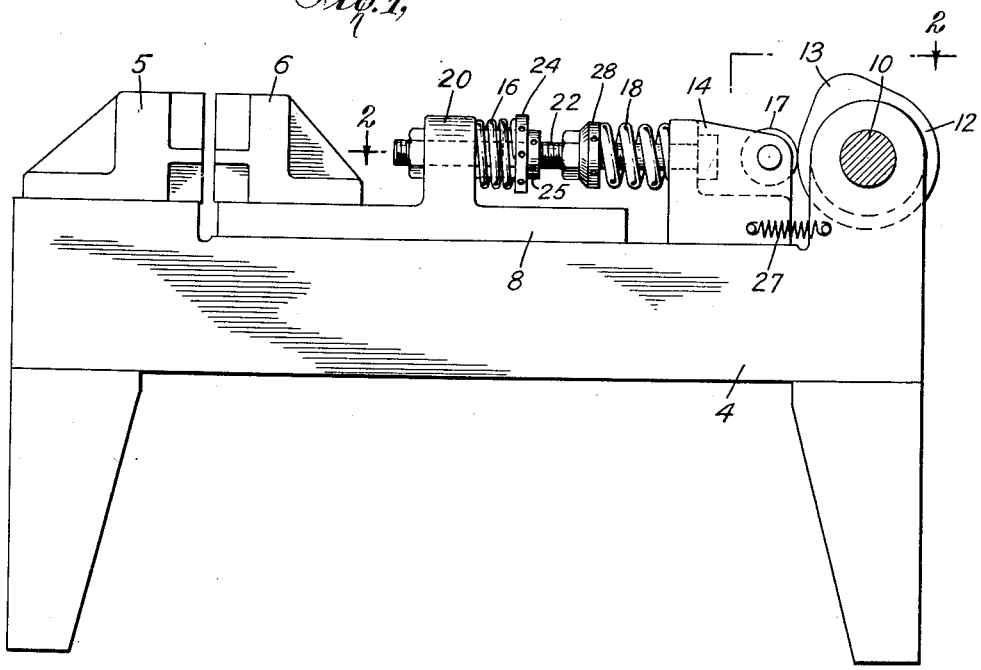
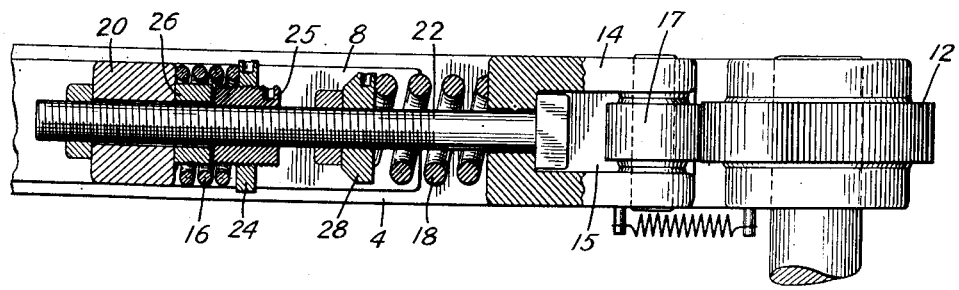
INVENTOR
James A. Muir
BY
Townsend & Decker
ATTORNEYS Patented Nov. 19, 1929

1,736,617

UNITED STATES PATENT OFFICE

JAMES A. MUIR, OF DETROIT, MICHIGAN, ASSIGNOR TO THOMSON ELECTRIC WELDING COMPANY, OF LYNN, MASSACHUSETTS, A CORPORATION OF MASSACHUSETTS

MECHANICALLY-OPERATED BUTT WELDER

Application filed November 11, 1926. Serial No. 147,715.

This invention relates to a mechanism for applying pressure to welding, forging, upsetting or other deforming machines wherein an article receives heat from an electric current supply.

It is one of the primary objects of the invention to place the articles to be welded in light contact so as to produce the resistance to electric current flow necessary to start flashing thus permitting heat to develop and insuring the maintenance of light contact during the heating period, with a rigid follow-up contact after the light contact has functioned.

It is a further object to provide a normally rigid yieldable mechanism for maintaining the full operative pressure of the apparatus during normal functioning of the same but which will automatically yield in case of failure of the apparatus to function in its intended manner due to any cause.

It is a more specific object to provide a relatively light contact spring for maintaining the normal pressure for the development of heat by electric current with a heavy spring in series with the light contact spring to prevent injury to the apparatus or work when the apparatus does not function properly. These and other objects will appear more fully from the following description when considered in connection with the drawings in which:

Fig. 1 is a side elevational view of one form which my invention may assume.

Fig. 2 is a horizontal sectional view taken on the line 2—2 of Fig. 1.

In making flash or other welds with a mechanically operated machine employing a sliding platen giving an unvarying welding speed it has been the usual practice to put the material in the clamps so that the welds are approximately 1/16 inches apart. This practice is undesirable for various reasons and is rendered unnecessary by the employment of the hereinafter described mechanism.

Referring to the drawings there is indicated a table or base 4 supporting the operative elements of the welding mechanism. This mechanism includes the stationary welding jaw 5 and the movable welding jaw 6. The latter may be adjustably supported on a movable platen 8 slidably supported in any desirable manner upon the table 4. It will be understood that the work holding jaws 5 and 6 constitute the electrodes of the electric welding apparatus and are designed to have the work (not shown) clamped thereto in any desirable or well known manner. The elements 5 and 6 are normally maintained in predetermined spaced relation but upon an operation of the machine the element 6 approaches more or less closely to the element 5 for producing the welding or other pressure as will appear more fully below.

The pressure is supplied from a rotatable shaft 10 on which there is secured a cam member 12 having a projecting portion 13 for moving the slidable platen 8 toward the fixed jaw 5. Any other suitable mechanism may be substituted for cam 12 as will be understood. The pressure from the projecting portion 13 of the cam is transmitted to the movable element 6 by means of a movable head 14 and spring elements 16 and 18 arranged in series in the pressure producing train. The head 14 is provided with a recess 15 receiving an anti-friction roller 17 normally engaged with the cam 12 so that upon a rotation of the shaft 10 the head 14 is periodically moved in a direction to create the welding pressure referred to above. The movable platen 8 is formed with a projection 20 formed with a longitudinal opening receiving the connecting bolt or rod 22, one end of the member 22 having an enlargement positioned within the recess 15 of the head 14. A suitable nut adjustably secured upon the end of the bolt or rod 22 prevents the separation of head 14 and platen 8. The relatively light contact spring 16 is shown as engaged at one end against the projection 20 of the movable platen the spring engaging at its other end against a spring adjusting nut 24 which may be mounted upon the adjustable sleeve 25, as shown herein. The sleeve 25 cooperates with a collar 26 for providing a limited clearance in which the contact spring 16 may be compressed. It is obvious that an adjustment of the sleeve 25 adjusts the clearance between the sleeve and projection 20 and also the extent of compression of the spring 16. The relatively strong spring 18 engages at one end against the head 14 and at the other end against the adjustable nut 28 which may be held in place by a suitable lock nut so that the strength of the spring 18 may be adjusted as desired.

It will be understood that any usual means, for example a spring 27 tensioned between the head 14 and base 4, may be employed for maintaining the roller 17 in engagement with the cam 12.

The spring 18 is normally adjusted to exert a force approximately equal to the necessary welding pressure of the electric resistance welding apparatus so that this spring does not yield until pressure in excess of the normal welding pressure is applied. If for any reason the movable jaw 6 or platen 8 cannot approach the fixed jaw 5 the movement of the head 14 under the influence of the cam projection 13 is accommodated by means of the spring 18. For example the projecting cam portion 13 may be extended outwardly from its axis further than necessary to provide a pushup in excess of that ordinarily required in order to have a factor of safety for this operation. The spring 18 having been previously adjusted by the nut 28 provides the proper pressure for the particular work being welded, the spring yielding to accommodate the excessive pushup pressure applied.

In the case of flash welding the light contact spring 16 permits the material to be secured to the clamping jaws with the ends initially in actual contact and the light tension of the spring insures a sufficiently light contact at the start of the weld that the ends will start flashing immediately. The pressure transmitting portion of the apparatus which is travelling at a uniform rate of speed may catch up with the spring 16 during the flashing period, the positive follow-up of the sleeve 25 and collar 26 assuring a substantially uniform rate of slide travel during the welding process. The light contact spring works to advantage even after the sliding platen is in motion, since if the current increases the spring 16 will release slightly and maintain the proper flashing contact, also if the current decreases the spring 16 will compress and maintain the proper flashing contact, thus acting as a cushion between the material and the positive slide travel. It should be borne in mind that the material is constantly being burned away in flash welding and possibly at varying speeds. The contact spring 16, therefore, within its range, always insures a light reasonably uniform contact. With the employment of the light spring 16 there is a slight range in which the pieces to be welded are in contact but not in such intimate contact, during the initial heating of the work, as to prevent that electric resistance at the joint which is necessary in order to start the conversion of the current into heat.

The operation of the apparatus is as follows: The ends of the work to be welded are brought into contact and the flow of current established. The current is of sufficient volume and intensity to blow out the metal forming the contact, an arc being thus established which burns away the ends of the metal. The parts being welded are fed toward one another during this burning away process, the spring 18 remaining in an unyielding condition. The spring 16 maintains the work in light contact since if the original contact between the ends of the work is under considerable pressure the contact will be so good that the current will not be sufficiently intense to blow out the metal and start the arc.

After sufficient metal has been burned off by the arc to square up the ends of the work and allow the parts to become sufficiently heated for welding, the cam 12 brings the ends of the work together with a quick motion and with considerable force, and at the same time the current supply may be automatically cut off. The parts of the work are thus brought into intimate contact, the spring 16 yielding to permit the rigid follow-up pressure through the elements 20, 25 and 26. The spring 18 supplies the full welding pressure required but yields where an excessive pushup movement is afforded or where for some reason the platen 8 cannot be advanced in the usual manner.

It will be understood that the strength of the contact spring 16 and pressure spring 18 as well as the clearance between the rigid follow-up members 25, 26, will be properly adjusted for the particular work being welded and for the particular current supply being used.

Having now described my invention I desire it to be understood that the embodiment herein shown and described is to be considered merely as illustrative of the basic principle of the invention and that changes may be made therein so long as they fall within the scope of the appended claims.

I claim:

1. In a metal working apparatus, a movable platen, means for applying power to said platen for moving the same, said means including a plurality of spring means acting in series in the pressure producing train, one of said spring means yielding within certain limits and at a light pressure and the other at a heavier pressure after said first-named spring has reached the limit of its yielding movement.

2. In a metal working apparatus, a movable platen, means for applying power to said platen for moving the same, said means including a plurality of spring means arranged in series, one of said spring means being yieldable at less pressure than the other in the normal operation of said apparatus and means for adjusting the spring which yields under greater pressure.

3. In a metal working apparatus, a movable platen, means for applying power to said platen for moving the same through a plurality of spring means arranged in series in the pressure producing train, one of said spring means being yieldable on light pressure applied thereto by the other, substantially unyielding means for limiting the yield of the lighter spring to cause the heavier spring to apply its full pressure to said platen.

4. In a metal working apparatus, the combination of a movable work-engaging element, power actuating mechanism, means for applying a yielding upsetting pressure from said actuating mechanism to said element, said means including devices operative within certain predetermined limits for applying a relatively light yieldable pressure to said element and devices for applying a substantially greater yieldable pressure during uniform operation of said power actuating mechanism.

5. In a metal working apparatus, a work-engaging element through which pressure is applied to the work, a movable head, a connecting member for limiting the separation of said element and head, a plurality of spring means for resisting the approach of said head to said element, one of said spring means being yieldable at one adjusted pressure and the other of said spring means being yieldable only at another and heavier pressure in the normal operation of said apparatus.

6. In a metal working apparatus, a work-engaging element through which pressure is applied to the work, a movable head, a connecting member for limiting the separation of said element and head, a plurality of spring means for resisting the approach of said head to said element, one of said spring means being yieldable at a light pressure and the other of said spring means being substantially rigid for the normal operation of said apparatus, and means carried by said connecting member for varying the effectiveness of said spring means.

7. In a metal working apparatus, a work-engaging element through which pressure is applied to the work, a movable head, a connecting member for limiting the separation of said element and head, a plurality of spring means for resisting the approach of said head to said element, one of said spring means being yieldable at a relatively light pressure and the other of said spring means being substantially rigid for normal operation of said apparatus and adjustable means carried by said connecting member for limiting the extent of yielding of said yieldable spring means.

8. In a metal working apparatus, a movable platen, means for applying power to said platen for moving the same, said means including two yieldable members arranged in series in the pressure producing train, one member being yieldable under the application of relatively light pressure, the other remaining substantially rigid for the normal operation of said apparatus, but yieldable upon the application of an excessive pressure to the same and means for positively limiting the extent to which said first-named member may yield.

Signed at Detroit in the county of Wayne and State of Michigan this 21 day of October, A. D. 1926.

JAMES A. MUIR.